Oct. 9, 1956   R. S. MARSDEN, JR   2,766,440
FLAME DETECTOR
Filed Dec. 10, 1951

INVENTOR.
R. S. MARSDEN, JR.

BY Hudson & Young

ATTORNEYS

United States Patent Office 2,766,440
Patented Oct. 9, 1956

2,766,440

FLAME DETECTOR

Ross S. Marsden, Jr., Bartlesville, Okla., assignor to Phillips Petroleum Company, a corporation of Delaware Application December 10, 1951, Serial No. 260,811

12 Claims. (Cl. 340—228)

This invention relates to flame detection.

An improved form of flame detector recently has been developed, based upon the principle that in any given electrical resistance element having two electrodes connected thereto, one of which is grounded, there exists a constant distribution of potential at all points throughout said element. In this respect it has been discovered that if a charged particle is brought into contact with the surface of the resistance element, a current will flow in said element until all points therein are once again at zero or ground potential. During that period of time when current is flowing in the resistance element, the region of the element in the neighborhood of the ungrounded electrode exhibits a potential variation which is dependent upon the magnitude of charge on the particle striking said element, the electrical resistance of the element, and the geometric relation of the ungrounded electrode with respect to the second grounded electrode. By measuring this potential variation through the use of a suitable amplifying circuit there is obtained an indication of the presence of any electrical particles striking the element. Since it is well known that ionized gases occur in the region of a flame, this procedure for measuring potential variation provides an effective means for detecting the presence of flame. Apparatus which can be employed in this manner to detect flame is fully described in the copending application of D. R. De Boisblanc, Serial No. 220,113, filed April 9, 1951, entitled "Detecting Device."

Since the electrical noise signals generated by a flame striking a resistance element are of extremely small magnitude, these signals must be amplified many fold before being of sufficient strength to readily actuate conventional detecting devices. As a means for providing a more sensitive flame detector element it has been discovered in accordance with the present invention that if the electrical resistance element positioned within the flame is coated with a material having a low thermionic work function, or if such a material is disposed adjacent thereto, then the electrical signal generated by flame impinging upon said resistance element has a magnitude many times greater than that produced by a similar detecting element without said coating. This improved form of detecting element, therefore, greatly extends the useful range of the above mentioned flame detector so as to include those flames which are accompanied by relatively weak ionization.

Accordingly, it is an object of this invention to provide an improved form of flame detector.

A further object is to provide flame detecting apparatus which is positive in action, reliable in result, of simplified construction, and which is capable of giving relatively large output signals.

Various other objects, advantages and features of this invention should become apparent from the following description taken in conjunction with the accompanying drawings illustrating a preferred embodiment of this invention in which.

Figure 1:
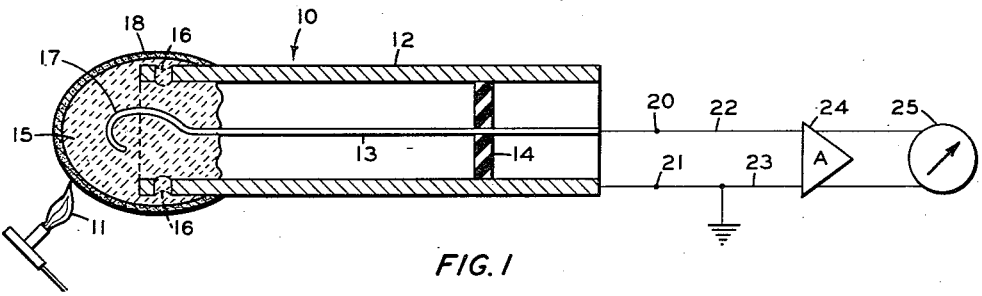
Figure 1 is a schematic representation of a flame sensing element together with suitable electrical detecting circuitry.

Referring now to the drawing in detail and to Figure 1 in particular, there is shown a flame sensing element 10 disposed in the region of a flame 11 whose presence is being indicated. Element 10, which is of a form more fully described in my copending application, Serial No. 220,116, filed April 9, 1951, entitled "Electrical Noise Element," comprises a cylindrical metallic casing 12 having a metallic electrode 13 positioned therein and electrically insulated from casing 12 by means of suitable insulating supports such as 14. A ceramic refractory tip 15 is positioned across one end of casing 12 and anchored thereto by means of holes such as 16 drilled near the tip end of casing 12. A hook-shaped end 17 of electrode 13 serves to anchor said electrode within tip 15. Tip 15 preferably is constructed of a baked and hardened refractory material such as aluminum oxide, since such a material is capable of withstanding the effects of high temperature flame. In addition to aluminum oxide, various other ceramic refractory materials such as the oxides of calcium, magnesium, zirconium, beryllium, and thorium, and the carbides of titanium, zirconium, columbium, tantalum, silicon, tungsten, and hafnium can be used to fabricate these electrical resistance elements. A pair of electrical output terminals 20 and 21 are attached to electrode 13 and casing 12, respectively. Leads 22 and 23, the latter being grounded, serve to connect output terminals 20 and 21, respectively, with a suitable detecting circuit which includes an alternating current amplifier 24 and an output indicating meter 25, which can be any suitable alternating current meter. A second form of indicating circuit can consist of a rectifier and direct current meter.

In accordance with the present invention a coating 18 of material having a low thermionic work function is disposed on the surface of ceramic tip 15. Suitable coating materials which can be so employed include the oxides of the alkaline earth group, especially the oxides of barium, calcium, and strontium. This coating 18 can be applied to the surface of tip 15 either as a spray or by a dip with an organic binder being used to make the coating adhere to said ceramic tip.

Although ceramic tip 15 normally is considered to be electrically non-conducting, at the elevated temperature produced by flame 11 impinging thereon, the electrical resistance of tip 15 is lowered somewhat so that the tip can be considered an electrical conductor in a limited sense. Thus, when flame 11 impinges upon tip 15, the ions contained within said flame 11 bombard the surface of tip 15, and in so doing generate electrical voltage fluctuations across the tip, each ion that strikes tip 15 introducing a small burst of current therein. The voltage fluctuations generated between casing 12 and electrode 13 by the individual bursts of current striking tip 15 are believed to have a statistical fluctuation of magnitude over a wide frequency range. However, these voltage fluctuations must be greatly amplified by amplifier 24 before being of sufficient magnitude to give a readable signal on meter 25.

While it previously has been found that satisfactory operation of such a flame detecting unit takes place as described in the absence of the low work function material coating 18 on tip 15, the resulting signal is greatly increased by the addition of such a coating. It is believed that by coating tip 15 with this low work function material 18, additional electrons tend to be emitted by the material which thereby aid in the generation of the electrical voltage signals. While the oxides of barium, calcium, and strontium have been suggested as preferable coatings for said probe, it should be evident that various other materials known in the art to have a low thermionic work function can be employed in this regard. Materials having a thermionic work function that is lower than the materials of which the detecting element is constructed serve to increase the magnitude of the output detected signal.

Figure 2:
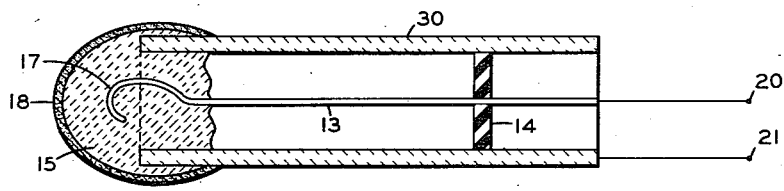
Figure 2 shows a modified form of the flame sensing element.

In Figure 2 there is shown a modified form of the flame sensing element 10 of Figure 1. This arrangement comprises a cylindrical ceramic casing 30 having a metallic electrode 13 positioned therein and electrically insulated from casing 30 by means of electrically insulating support 14. A ceramic tip 15 is secured across the end of casing 30 in the manner described above with reference to Figure 1. Tip 15 likewise is coated with a low work thermionic work function material 18. Output terminals 20 and 21, corresponding to like designated terminals in Figure 1, are connected to electrode 14 and casing 30, respectively.

Figure 3:
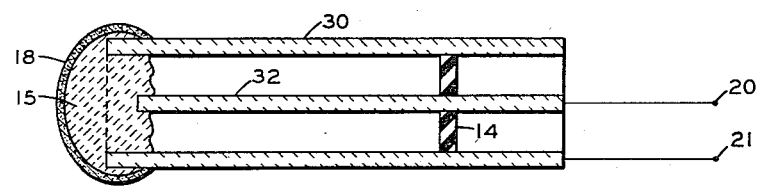
Figure 3 shows another modified form of the flame sensing element.

Figure 3 illustrates a third modified form of flame sensing element. In this embodiment a cylindrical ceramic casing 30 is provided with a ceramic rod 32 positioned within casing 30 and electrically insulated therefrom by electrically insulating support 14. A ceramic tip 15 having a low thermionic work function coating 18 disposed thereon likewise is secured across the ends of casing 30 and electrode 32. Output terminals 20 and 21, corresponding to like designated terminals in Figure 1, are connected to electrode 32 and casing 30, respectively.

It should be pointed out that the various ceramic materials employed in constructing these probes are electrically conducting at the elevated temperatures under consideration, that is, these ceramic materials exhibit a negative thermal coefficient of resistance.

Figure 4:
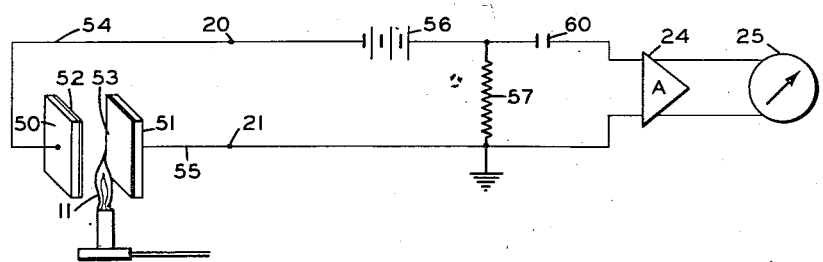
Figure 4 illustrates a fourth type of sensing element together with a second form of electrical indicating circuitry.

A fourth embodiment of the flame detector is illustrated in Figure 4, which embodiment comprises an ionization gap formed by opposing spaced electrodes 50 and 51 having coatings 52 and 53 of low thermionic work function material disposed thereon. It has been discovered that an air gap defined by a pair of spaced opposing electrodes also is effective as an electrical voltage generating element when a flame such as 11 is directed between the opposing electrodes 50 and 51. In this embodiment air is considered the "resistance element" connecting the two spaced electrodes. Electrical leads 54 and 55 serve to connect electrodes 50 and 51 to output terminals 20 and 21, respectively. The output electrical detecting circuit employed in Figure 4 is a modification of the circuit illustrated in Figure 1 in that a voltage source 56 and a resistor 57, one terminal of which is grounded, are connected in series relationship with the output terminals 20 and 21. Alternating current amplifier 24 is applied across resistor 57 and coupled thereto by means of a capacitor 69, the output of amplifier 24 again being applied to a suitable indicating meter 25. When flame 11 is present between electrodes 50 and 51 a direct current circuit path is provided from battery 56, through resistor 57, through the ionization gap formed by the electrodes 50 and 51, and back to battery 56, the ions contained in flame 11 serving to complete the circuit path between electrodes 50 and 51. However, the signal on meter 25 is not indicative of this small direct current flow, but rather consists entirely of the alternating current electrical voltage fluctuations generated by the action of flame 11 between electrodes 50 and 51. By coating the opposing spaced electrodes 50 and 51 with a suitable material having a low thermionic work function it is found that the magnitude of this output signal is considerably increased over the signal that is provided in the absence of the low work function coating. Improved results are obtained by coating either one or both of the opposing electrodes 50 and 51. Although improved results are obtained regardless of the polarity connections of voltage source 22, readings of greater magnitude are realized with the negative terminal of battery 56 being applied to the non-grounded electrode 50.

It should be pointed out in connection with Figure 4 that the air gap defined by the electrodes 50 and 51 is in no way equivalent to ionization gages and flame detection apparatus known in the prior art which employ the principle of completing an electrical circuit through an air gap by means of an electrically conducting flame. In the various prior art devices an external source of voltage is applied across a normally non-conducting air gap with the result that any conduction thereacross due to the ionization accompanying any flame directed therein is detected by means of the completed electrical circuit. This direct current flow through the air gap is not the signal being detected in the present invention, but rather what is being detected is the alternating current electrical voltage fluctuations generated by the action of flame 11 between electrodes 50 and 51.

It should be noted that the electrical detecting circuit illustrated in Figure 1 can be employed with any of the flame detecting elements described in Figures 2, 3, or 4; and the electrical detecting circuit of Figure 4 can be employed equally well with any of the detecting elements described in Figures 1, 2, and 3.

From the foregoing description it should be apparent that there has been provided by this invention an improved form of flame detector which constitutes a coating of low thermionic work function material being applied on or in close proximity to the detecting elements described in the aforementioned copending applications. The addition of this low work function material to these various flame detector elements results in an output signal of considerably higher magnitude than is provided without said coating.

While this invention has been described in conjunction with present preferred embodiments thereof, it is to be understood that various changes in details of the apparatus described can be made without departing from the scope of the invention. It further should be understood that the theory set forth herein, although believed to be accurate, is not to be considered as the sole basis of the operativeness of this invention. Instead, it is to be understood that this apparatus does operate in a successful and efficient manner whether or not upon the principles described.

Having described my invention, I claim:

1. A flame detecting element comprising, in combination, a pair of opposing spaced electrodes, and an electrically conducting ceramic refractory tip disposed between and making electrical contact with said electrodes, said tip having a coating thereon of a material having a lower thermionic work function than does said tip.

2. A flame detecting element comprising, in combination, a cylindrically shaped metallic casing, an elongated metallic electrode positioned axially within and electrically insulated from said casing, electrical leads connected to said casing and to said electrode, and an electrically conductive ceramic refractory tip disposed across one end of said casing and making electrical contact with said casing and with said electrode, said tip having a coating thereon of a material having a lower thermionic work function than the thermionic work function of the material of said ceramic tip.

3. The combination in accordance with claim 2 wherein said coating material is selected from the group consisting of barium oxide, calcium oxide, and strontium oxide.

4. A flame detecting element comprising, in combination, a cylindrically shaped electrically conductive ceramic casing having an electrical lead attached thereto, said casing forming a first electrode, an elongated metallic second electrode positioned axially within and electrically insulated from said casing, and an electrically conductive ceramic refractory tip disposed across one end of said casing and making electrical contact with said casing and with said second electrode, said ceramic tip having a coating thereon of a material having a lower thermionic work function than the thermionic work function of said ceramic tip.

5. The combination in accordance with claim 4 wherein said coating material is selected from the group consisting of barium oxide, calcium oxide, and strontium oxide.

6. A flame detecting element comprising, in combination, a cylindrically shaped electrically conductive ceramic casing having an electrical lead attached thereto, said casing forming a first electrode, an electrically conductive ceramic rod positioned axially within and electrically insulated from said casing, said rod having an electrical lead attached thereto, said rod forming a second electrode, and an electrically conductive ceramic refractory tip disposed across one end of said casing and making electrical contact with said casing and with said rod, said ceramic tip having a coating thereon of a material having a lower thermionic work function than the thermionic work function of said ceramic tip.

7. The combination in accordance with claim 6 wherein said coating material is selected from the group consisting of barium oxide, calcium oxide, and strontium oxide.

8. A flame detector comprising, in combination, a pair of opposing spaced electrodes, an electrical resistance element disposed between and making electrical contact with said electrodes, said resistance element having a quantity of material having a low thermionic work function disposed thereon, amplifying means having the input terminals thereof connected to respective ones of said pair of electrodes, and means to indicate the output signal from said amplifying means.

9. A flame detector comprising, in combination, a pair of opposing spaced electrodes, an electrically conductive ceramic refractory tip disposed between and making electrical contact with said electrodes, said tip having a coating thereon of a material having a lower thermionic work function than does said tip, amplifying means having the input terminals thereof connected to respective ones of said pair of electrodes, and means to indicate the output signal from said amplifying means.

10. A flame detector comprising, in combination, a pair of opposing spaced electrodes, an electrically conductive ceramic refractive tip disposed between and making electrical contact with said electrodes, said tip being constructed in part of a material having a low thermionic work function, amplifying means having the input terminals thereof connected to respective ones of said electrodes, and means to indicate the output signal of said amplifying means.

11. A flame detector comprising, in combination, a cylindrically shaped metallic casing, an elongated metallic electrode positioned axially within and electrically insulated from said casing, an electrically conductive ceramic refractory tip disposed across one end of said casing and making electrical contact with said casing and with said electrode, said tip having a coating thereon of a material having a lower thermionic work function than the thermionic work function of the material of said ceramic tip, amplifying means having one input terminal connected to said casing and the second input terminal connected to said electrode, and means to indicate the output signal of said amplifying means.

12. The combination in accordance with claim 1 wherein said tip is formed of materials selected from the group consisting of the oxides of aluminum, calcium, magnesium, zirconium, beryllium and thorium, and the carbides of titanium, zirconium, columbium, tantalum, silicon, tungsten, and hafnium, and wherein said coating is formed of materials selected from the oxides of barium, calcium, and strontium.

References Cited in the file of this patent

UNITED STATES PATENTS

| | | |
|---|---|---|
| 1,773,826 | Simms | Aug. 26, 1930 |
| 2,127,977 | Lamb | Aug. 23, 1938 |
| 2,316,872 | Kernen | Apr. 20, 1943 |
| 2,413,125 | Walbridge | Dec. 24, 1946 |
| 2,455,351 | Beam, et al. | Dec. 7, 1948 |
| 2,477,348 | Postal | July 26, 1949 |
| 2,487,526 | Dahm, et al. | Nov. 8, 1949 |
| 2,523,017 | Harrison | Sept. 19, 1950 |
| 2,586,252 | Peters | Feb. 19, 1952 |

FOREIGN PATENTS

| | | |
|---|---|---|
| 368,882 | France | Dec. 19, 1906 |
| 190,657 | Great Britain | Dec. 28, 1922 |